United States Patent Office 3,347,801
Patented Oct. 17, 1967

3,347,801
3-DIFLUOROAMINOMETHYL-3-DIFLUOROAMINO-OXETANE AND POLYMERS THEREOF
Eugene L. Stogryn, Fords, N.J., assignor to Esso Research and Engineering Company, a corporation of Delaware
No Drawing. Filed Nov. 16, 1962, Ser. No. 239,102
9 Claims. (Cl. 260—2)

This invention relates to a novel high-energy polymerizable heterocyclic compound, polymers thereof, and the synthesis of the compound and the synthesis of the polymers.

The new high-energy polymerizable monomer is the $N_2F_4$ adduct of 3-methylene oxetane, termed 3-difluoraminomethyl 3-difluoramino oxetane, synthesized in accordance with the following general equation:

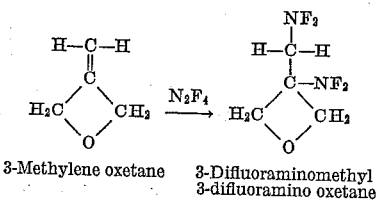

3-Methylene oxetane    3-Difluoraminomethyl 3-difluoramino oxetane

Difluoramino-containing cyclic ethers, known as epoxides, have been prepared for polymerization to high-energy binders to be used in solid rocket propellants. Such epoxides contain a 3-membered epoxy or oxirane

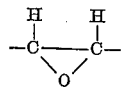

group, shown as follows:

Polymerization of the $NF_2$-containing epoxides is relatively slow and generally the polymerization yields oily or relatively low molecular weight polymers, which contain primary as well as secondary hydroxyl groups. The difference in reactivity of the terminal OH groups, depending on whether they are primary or secondary, tends to make the rate of reaction of these groups nonuniform in curing the polymers, as by reaction with cross-linking agents or chain-extending reactants.

In accordance with the present invention, it has been found that polymers formed from 3-difluoraminomethyl 3-difluoramino oxetane have improved physical and chemical characteristics in their utilization for preparing high-energy binders as compared to $NF_2$-containing polyethers formed from epoxides. The polymers of the oxetane are represented by the following recurring unit formula:

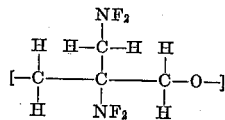

The recurring monomeric unit shown will have terminal hydroxyl, OH, groups attached to the methylene $(-CH_2-)$ groups in the chain and these terminal hydroxyl groups are indicated to be only primary hydroxyls $(-CH_2OH)$.

The polyether derived from the oxetane on treatment with alcoholic caustic for 48 hours gives up less than half the theoretical amount of fluorine present in this polyether, whereas $NF_2$-containing polyethers formed from epoxides on the same kind of hydrolytic treatment almost lose all of their fluorine content. This relatively high hydrolytic stability of the $NF_2$-containing oxetane polymer evidently arises from the fact that the oxetane polymer, as indicated in the recurring monomeric unit structure, has an $NF_2$ group on a tertiary carbon atom in the polymer chain nucleus.

Another distinguishing characteristic of the oxetane polymer compared to polyethers formed from epoxides can be attributed to the chain structure shown in the monomeric unit. The monomeric unit of the polymer from the oxetane has one more carbon atom in the chain per unit than the monomeric unit of polymers formed from the epoxides. This difference is believed to contribute to greater strength and elasticity of the oxetane polymers on the basis that the side chain or pendant groups do not contribute to the strength of the polymer, but rather the numbers of atoms incorporated into the backbone or chain of the polymer. Where the end use of the $NF_2$-containing polymers is a chain-extending or cross-linking type of reaction, such as with diisocyanates, the strength of the polymers formed from the oxetane should have a distinct advantage.

Although modifications may be made in the synthesis of the $N_2F_4$ adduct of the oxetane monomer and of its polymerization, the following examples give a detailed description of processes used for the preparation of the desired compounds. The monomeric compound 3-methylene oxetane used for the purpose of the present invention has been prepared according to the procedure described by D. E. Applequist and J. D. Roberts in the "Journal of American Chemical Society," vol. 78, page 4022 (1956). Alternative procedures have been used also for preparing this compound.

*Example 1.—Preparation of the $N_2F_4$ adduct of 3-methylene oxetane*

3-methylene oxetane, 7.14 mmoles, is dissolved in 2 mls. of Freon 113 ($C_2Cl_3F_3$). This solution is placed in a Fischer-Porter glass pressure reactor of approximately 13 ml. capacity. After degassing, 14 mmoles of $N_2F_4$ are introduced into the reactor and the temperature is raised to 80° C. and held there for 5 hours. After removal of excess $N_2F_4$, the reactor is placed in a bath held at −20° C. and allowed to equilibrate with a previously evacuated trap which is maintained at a temperature of −76° C. By this procedure the Freon 113 is removed. A gas chromatographic analysis of the crude product indicates that essentially all of the Freon 113 has been removed. The weight of the crude product equals 1.14 grams. The crude product can be redistilled by a trap-to-trap distillation using a warm-water bath. The infrared and the proton and fluorine NMR spectra are in excellent agreement with the structure 3-difluoraminomethyl 3-difluoramino oxetane. Calculated for $C_4H_6ON_2F_4$: Percent C, 27.6; percent N, 16.1; percent F, 43.6. Found: Percent C, 27.4; percent N, 16.1; percent F, 43.8.

Addition of $N_2F_4$ to 3-methylene oxetane proceeded smoothly and without complications under the conditions described, particularly in using the excess $N_2F_4$ and using 5 mmole percent NaF in the mixture of the reactants. The sodium fluoride, NaF, acted as a buffer to eliminate the formation of polymers during difluoramination.

In general, the addition reaction of $N_2F_4$ with the 3-methylene oxetane is indicated to take place at a reaction temperature in the range of about 25° to 150° C. in the presence of a halohydrocarbon solvent or inert diluent.

The resulting adduct having the 4-membered heterocyclic ring with the $NF_2$ group linked to carbon in the 3 position of the ring and an $NF_2$ group linked to the methylene group which is directly linked to the 3 position carbon has a structure such as has been identified and which is termed 3-difluoraminomethyl 3 - difluoramino oxetane. This compound proved to be readily polymerizable under very mild conditions with cationic catalysts, such as $PF_5$ and $BF_3$. The resulting polymers were generally colorless or a very pale yellow, with molecular weights ranging from about 1,000 to 10,000. The polymers were tacky materials which could be drawn into strands. Low molecular weight polymers, which were viscous oils, were obtained at low polymerization temperatures with short polymerization reaction periods and with the use of modifiers such as $H_2O$ and alcohol, e.g. 1,1,1-trimethylol propane. The higher molecular weight polymers, 5,000+molecular weight, were semi-solid to solid and these were elastic. The infrared and elemental analyses of the polymers showed that the $NF_2$ groups remained intact and attached to the carbon atoms during the polymerization using the procedure set forth in the following examples.

*Example 2.—Polymerization of 3-difluoraminomethyl 3-difluoramino oxetane*

3 - difluoraminomethyl 3 - difluoramino oxetane, 0.4 g. was introduced into a suitable polymerization vessel. The reactor was cooled to −196° C. with the use of a liquid nitrogen bath and 6.5 mole percent $PF_5$ was condensed in the reactor. The reactor was then allowed to warm up to the desired temperature of polymerization and held there for a predetermined period of time.

The polymerization was terminated by removal of catalyst, either by pumping it off or shaking with a dilute $Na_2CO_3$ solution, or both. The polymers recovered had the recurring unit composition $[C_4H_6ON_2F_4]_n$, the subscript $n$ signifying, in conventional manner, the number of units per molecule, e.g. in the range of about 4 to 80 and more, depending on the molecular weight.

Polymer products obtained were found to contain as many as 1.7 to 2 OH groups per molecule. Such high values of hydroxyl/polymer molecule are desirable in chain-extension and cross-linking compounds having functional groups that react with the OH groups or the reactive H of these groups.

Variations can be made in the procedure as to catalyst, catalyst concentration, time, temperature, the use of solvents, e.g. halohydrocarbon, and modifiers for varying the molecular weight of the polymer product and also for variations in the terminal groups, if desired.

The following table summarizes a number of typical variations in polymerization conditions, catalyst, and use of modifiers and solvents, with results achieved.

TABLE I.—POLYMERIZATION OF 3-DIFLUORAMINO-METHYL 3-DIFLUORAMINO OXETANE

| Catalyst [a] | Modifier/Solvent [b] | Time, hrs. | Temp., ° C. | Polymer [c] |
|---|---|---|---|---|
| $PF_5$ (6.5) | --- | 3, 17 | −20, 25 | 9,190 |
| $PF_5$ (6.5) | $2H_2O$/--- | 0 | 0 | 8,705 |
| $PF_5$ (8.2) | ---/$CH_2Cl_2$ | 4, 16 | −30, 25 | 1,400 |
| $PF_5$·THF | --- | 0 | 25 | (e) |
| $PF_5$ (6.5) | $2H_2O/CH_2Cl_2$ | 18 | 25 | 9,783 |
| $PF_5$ (6.5) | 2TMP/---[d] | 16 | 25 | 3,004 |
| $BF_3$·$Et_2O$ (10) | ---/$CH_2Cl_2$ | 4, 90 | 25, 60 | 1,400 |

[a] Figures show mol percent catalyst based on monomer.
[b] Indicates mol percent modifier based on monomer.
[c] Figures indicate molecular weight of polymer obtained from solution of the polymer in acetonitrile.
[d] TMP is 1,1,1-trimethylol propane as hydroxyl group-containing modifier.
[e] Viscous oil.

The elemental analysis of the polymers demonstrates the preservation of the $NF_2$ groups during the course of polymerization. Calculated for $[C_4H_6ON_2F_4]_n$: percent C, 27.6; percent N, 16.1; percent F, 43.6. Found: percent C, 26.42; percent N, 15.5; percent F, 43.8.

It was thus demonstrated that the bis($NF_2$) adduct of the methylene oxetane monomer can be polymerized readily with a variety of catalysts of the type useful in forming polyethers which, in general, includes metal and metalloid halides. The higher molecular weight polymers formed from the bis(difluoramino) adduct of methylene oxetane monomer are sufficiently strong and elastic to be used as a binder in forming a propellant composite having a high impulse value, as indicated in the following formulation:

| Component: | Wt. percent |
|---|---|
| Liquid tetrakis $NF_2$ (butane) | 35 |
| $NH_4ClO_4$ (oxygen oxidizer) | 40 |
| Boron powder (fuel) | 5 |
| $[C_4H_6ON_2F_4]_n$ (binder) | 20 |
| Isp | 300 |

The above is a typical formulation which can be varied by using other fuels, such as powdered metals of the group consisting of boron, beryllium, aluminum, magnesium, lithium and hydrides of such metals; other fluorine ($NF_2$) and oxygen oxidizers, such as tetrakis ($NF_2$) tetrahydrofuran, hydrazine perchlorate, hydrazine nitroform, ammonium perchlorate, and various others known or to be developed. The binder is represented by the recurring polymeric unit in the bracket as being the polymer of 3 - difluoraminomethyl 3 - difluoramino oxetane. The polymers of the $N_2F_4$ adduct of methylene oxetane can be reacted to undergo chain-extension or chain cross-linking with reactants, such as diisocyanates which form polyurethanes, or with reactants such as acrylic acid which form polyester linkages, in order to give the polymers a further increased molecular weight, strength, and elasticity. The reaction of the polymers is illustrated by the following example.

*Example 3.—Chain-extension polymerization*

Poly - 3 - difluoraminomethyl 3 - difluoramino oxetane was dissolved in methylene chloride. To this solution was added a catalytic amount of ferric acetylacetonate and toluene diisocyanate in concentration required to bring about chain-extension polymerization of the polyether to a higher molecular weight polyurethane. The solution was placed on a steam-bath and allowed to cure to a light tan, tough, elastomeric polymer.

The energy values of the chain-extended and cross-linked polymers of 3-difluoraminomethyl 3 - difluoramino oxetane are high on account of their high $NF_2$ content, i.e. close to 60%.

Modifications in conditions of reaction, proportions of reactants, solvents, and modifying conditions may be made within the spirit and scope of the invention claimed.

The invention described is claimed as follows:

1. 3 - difluoraminomethyl 3 - difluoramino oxetane having the composition $C_4H_6ON_2F_4$ and the structural formula:

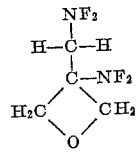

2. Polymers of 3 - difluoraminomethyl 3 - difluoramino oxetane having the recurring unit:

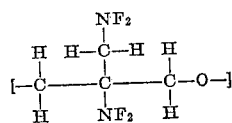

3. Polyether polymers of 3-difluoroaminomethyl 3-difluoroamino oxetane having a molecular weight in the range of about 1,000 to about 10,000.

4. Method of preparing the $N_2F_4$ adduct of 3-methylene oxetane which comprises reacting 3-methylene oxetane with $N_2F_4$ to form an addition product having a composition of $C_4H_6ON_2F_4$, and recovering said addition product.

5. Method of preparing 3 - difluoraminomethyl 3-difluoramino oxetane which comprises reacting 3-methylene oxetane with excess $N_2F_4$ for addition reaction of one mole of $N_2F_4$ with one mole of the 3-methylene oxetane at a reaction temperature in the range of 25° to 150° C. in the presence of an inert diluent, and recovering as resulting addition product 3-difluoraminomethyl 3-difluoramino oxetane.

6. The method of claim 5, wherein the reaction is carried out in the presence of a halohydrocarbon solvent as the inert diluent and NaF.

7. Method of preparing a high-energy polyether having a recurring unit composition of $[C_4H_6ON_2F_4]$ which comprises polymerizing 3 - difluoraminomethyl 3 - difluoramino oxetane catalytically at a temperature in the range of about $-30°$ C. to about $60°$ C., and recovering a resulting polyether polymer.

8. The method of claim 7, in which the polymerizing is carried out in the presence of an inert diluent.

9. The method of claim 7, in which the polymerizing is carried out in the presence of a hydroxyl group-containing modifier.

References Cited

Farber: "Astronautics," 1960, pp. 34, 40 and 42.

Hoffman et al.: "Chemical Reviews," vol. 62 (February 1962), pp. 12–15.

SAMUEL H. BLECH, *Primary Examiner.*